United States Patent [19]

Menning

[11] Patent Number: 4,823,771
[45] Date of Patent: Apr. 25, 1989

[54] APPARATUS FOR SOLAR HEATING

[76] Inventor: Jurgen Menning, 7490 SW. 104 St., Miami, Fla. 33156

[21] Appl. No.: 83,182

[22] Filed: Aug. 10, 1987

[51] Int. Cl.⁴ ................................................. F24J 2/24
[52] U.S. Cl. ..................................... 126/448; 126/446; 126/416; 126/426; 126/442; 165/176
[58] Field of Search ............... 126/426, 415, 416, 448, 126/442, 446; 165/176, 46; 62/235

[56] References Cited

U.S. PATENT DOCUMENTS

| | | | |
|---|---|---|---|
| 2,978,225 | 4/1961 | Dallas | 165/176 X |
| 3,513,828 | 11/1968 | Masters | 126/426 |
| 3,868,945 | 3/1975 | Koncopka | 126/416 |
| 3,991,742 | 11/1976 | Gerber | 126/416 |
| 4,112,921 | 9/1978 | MacCracken | 126/448 |
| 4,256,087 | 3/1981 | Sowens | 126/415 |
| 4,269,172 | 5/1981 | Parker et al. | 126/448 X |
| 4,270,596 | 6/1981 | Zinne et al. | 165/46 X |
| 4,290,413 | 9/1981 | Goodman et al. | 126/426 |
| 4,312,323 | 1/1982 | Domenech | 126/426 X |
| 4,321,911 | 3/1982 | Offutt | 126/448 |
| 4,354,546 | 10/1982 | Zinn | 126/449 X |
| 4,360,005 | 11/1982 | Sharpe | 126/422 |
| 4,381,764 | 5/1983 | Wajcik | 126/426 |
| 4,402,305 | 9/1983 | Kremen | 126/415 |
| 4,483,312 | 11/1984 | Sharpe | 126/77 |

FOREIGN PATENT DOCUMENTS 2099984 12/1982 United Kingdom ................ 126/416

OTHER PUBLICATIONS

"Sola Roll Systems for Solar Heating & Lighting", Bio-Energy Systems, Inc, 1979.

Primary Examiner—Samuel Scott
Assistant Examiner—Carl D. Price
Attorney, Agent, or Firm—John H. Faro

[57] ABSTRACT

A solar energy system for the heating of water in a spa or the like. The system comprises a solar collector array for receiving water from the spa, for heating the received water, and for then directing the heated water back to the spa. The solar collector array is formed of a plurality of sets of tubes positionable on a supporting surface adjacent to the spa with webbing coupling the tubes of each set along the majority of their lengths. Inlet and outlet manifolds couple the ends of the tubes. A submersible pump is positioned within the spa for pumping water to the solar collector array for heating. An inlet hose is coupled between the pump and the inlet manifold to conduct water from the pump to the solar collector array while an outlet hose is coupled to the outlet manifold to conduct the heated water from the solar collector array back to the spa. Also discloses is the method of installing, using and storing the solar energy system.

3 Claims, 2 Drawing Sheets

APPARATUS FOR SOLAR HEATING

BACKGROUND OF THE INVENTION

1. Field of the Invention

This invention relates to solar heating and, more particularly, to a method and apparatus for heating spas with a portable solar energy heating system having a solar collector array formed of sets of tubes and webbing, an inlet and outlet manifold coupled to the ends of the tubes, and hoses coupled to the manifolds for conducting water between the spa and the solar collector array.

2. Description of the Background Art

Diminishing supplies of conventional fuels along with their increasing costs have resulted in greater attention being paid to the conservation of energy. Consequently, nonconventional energy sources such as solar energy have become the subject of investigation and use. One field which has been found to be readily adaptable to the benefits of solar energy is the heating of spas. Spas are small pools of bathing water used for therapeutic purposes or simply for relaxation. Spas are frequently provided with jets of water or flows of air bubbles and have their water heated to temperatures of about 95°–100° F. degrees Fahrenheit for enhancing the value and enjoyment of their use. In addition to the problem of fuel costs and availability, many localities have enacted ordinances which prohibit the use of conventional fuels for heating spas, swimming pools and the like. Solar heating has thus not only become increasingly popular but now constitutes the only practical solution to the problem of heating spas in many areas.

Due to the present limitations on the use of conventional fuels for heating spas, there has been a flurry of technical activity attempting to develop a solar energy heating system for home use by the average spa owner which is efficient, reliable, convenient and economical. As a result, a wide variety of types of solar energy heating device have, in fact, been developed and are in commercial use. All of the presently known and utilized solar energy heating devices, however, have significant drawbacks in one aspect or another. Some are inefficient, incapable of raising the water temperature to a satisfactory temperature in a reasonable time. Others are difficult to install and store. Yet others are expensive to manufacture and maintain or have unacceptable life spans.

Attempts are continuing in an effort to correct the problems inherent in known solar energy heating devices. All such attempts have proven unsuccessful in one aspect or another. As a result, custom designed systems have become increasingly popular. Such custom designed systems, however, are extremely costly and beyond the financial resources of most spa owners.

The patent literature discloses many types of devices as well as a wide variety of techniques which utilize solar energy for heating purposes such as for the heating of water for spas and the like. Note, for example, U.S. Pat. No. 4,381,764 to Wojcik. According to the Wojcik disclosure, a solar panel is employed for use in the heating of spas, swimming pools and the like. The disclosed device includes a plurality of elongated, flexible conduits secured together in a side by side relationship at spaced points. The conduits are interconnected at their extremities to manifolds. The panel may be stored and shipped in some type of a rolled-up, preassembled configuration and may be installed by unrolling the panel onto a suitable supporting surface. The conduits are unconnected to each other along the majority of their lengths thus making the proper installation of the device, as well as its storage, difficult.

U.S. Pat. No. 4,269,172 to Parker et al discloses a solar water heating device which includes a collector formed of plastic ducting with intake and return manifolds. The Parker et al device is primarily designed as a non-portable structure, permanently installed upon specially constructed roofs. It is, thus, neither portable nor suitable for use with limited support surface.

The patent to Zinn et al, U.S. Pat. No. 4,270,596, shows a flexible heater formed as a mat of tubes. The device is particularly adapted for use in embedded radiant heating systems. It includes a plurality of webbed tube mats and associated manifolds. Tubes are separated from their adjacent tubes along tear lines located along two longitudinally spaced portions of the mat. The device is designed for being supported upon a specially constructed supporting surface. The use of the Zinn et al device in association with its specially constructed supporting structure renders it economically impractical for use with spas.

The Zinn patent, U.S. Pat. No. 4,353,352, discloses a solar water heater assembly with inlet and outlet manifolds. The outlet manifold also serves as a storage tank. The manifolds are connected by a solar heat absorber which includes flexible rubber tube strips, each formed of multiple tubes connected by separable ribs. The strips may be rolled up about the storage tank or inlet manifold. The size, complexity and cost render it impactical for use in heating spas.

Other types of solar heating devices in the patent literature include units positionable upon the water, under the water, and around the water. Note, for example, U.S. Pat. Nos. 4,256,087 to Sowers; 4,402,305 to Kremen and 4,312,323 to Domenech. Additionally, a large body of disclosed devices for solar heating are particularly adapted for positioning upon the roofs of buildings. Note, by way of example, the Gerber U.S. Pat. No. 3,991,742, the Masters U.S. Pat. No. 3,513,828, the Konopka et al U.S. Pat. No. 3,868,945 as well as two U.S. Pat. Nos. 4,360,005 and 4,483,312 to Sharpe. Lastly, some of the background art to solar energy devices specifically relate to component coupling and manifold configurations. Note, for example, U.S. Pat. Nos. 4,321,911 to Offutt and 4,290,413 to Goodman et al.

All of these patents disclose structures for employing solar energy for heating purposes and include, to a limited degree, certain features having some element of use or structural similarlity to the method and apparatus of the instant invention. Neither these patents nor the known commercial devices teach or suggest the efficient, reliable, convenient, and economical method and apparatus as described and claimed herein. Known apparatus and methods employing solar energy for heating spas and the like are simply lacking in one regard or another.

As illustrated by the great number of prior patents and commercial devices, efforts are continuously being made in an attempt to heat spas by solar energy more efficiently, conveniently, reliably and economically. None of these previous efforts, however, suggests the present invention combination of method steps and component elements arranged and configured as disclosed and claimed herein. Prior techniques and apparatus do not provide the benefits attendant with the present invention. The present invention achieves its intended purposes, objectives and advantages over the prior art devices through a new, useful and unobvious combination of methods steps and component elements, with the use of a minimum number of functioning parts, at a reduction is costs to manufacture and utilize, and by employing only readily available materials.

These objects and advantages should be constructed as merely illustrative of some of the more prominent features and applications of the present invention. Many other beneficial results may be attained by applying the disclosed invention in a different manner or by modifying the invention within the scope of the disclosure. Accordingly, other objects and advantages as well as a fuller understanding of the invention may be had by referring to the summary and detailed description of the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into a portable solar energy system for the heating of water in a spa or the like. The system comprises a solar collector array for receiving water from the spa, for heating the received water, and for then directing the heated water back to the spa. The solar collector array is formed of a plurality of sets of tubes positionable on a supporting surface adjacent to the spa. A submersible pump is positionable within the water of the spa for pumping water to the solar collector array for heating. An inlet hose is coupled between the pump and the solar collector array to conduct water from the pump to the solar collector array. An outlet hose is coupled to the solar collector array to conduct the heated water from the solar collector array back to the spa. The solar energy system further includes an inlet manifold and an outlet manifold coupling the opposite ends of the tubes of the solar collector array with the inlet hose and outlet hose. The solar energy system further includes webbing coupling the tubes of each set along the majority of their lengths to facilitate the installing and the storing of the solar energy system. The webbing extends along the lengths of the tubes from locations near the ends of the tubes to locations near the longitudinal central line of the tubes.

The invention may also be incorporated into a solar collector array adapted to receive water from a spa, to heat the received water and then to conduct the heated water back to the spa. The solar collector array includes a cylindrical inlet manifold having an axial opening by which water from the spa may be recieved, a cylindrical outlet manifold having an axial opening by which heated water may be conducted back to the spa, and a plurality of sets of tubes coupling the inlet manifold with the outlet manifold, with each of the sets of tubes having webbing connecting the tubes along the majority of their lengths, the webbing having terminating lines a distance remote from the ends of the tubes and terminating lines a distance remote from the longitudinal central line of the tubes. The inlet manifold and the outlet manifold each have a series of radial holes extending along their lengths for coupling with the ends of the tubes. The radial holes of the inlet manifold are equal in number to the radial holes of the outlet manifolds as well as the number of tubes. The radial holes of the inlet manifold and the outlet manifold are equal spaced along their lengths. The solar collector array further includes an end cap secured to one end of each manifold and, at the other end of each manifold, apparatus for coupling the manifold with a hose. The apparatus for coupling the manifold with a hose includes a coupler secured over the end of the manifold and a nipple having an internal end extending axially through the coupler and an external end for being received by a hose.

In addition, the present invention may also be incorporated into a method of installing a system for the solar heating of water in a spa. The method comprises the steps of providing a solar collector array having cylindrical inlet and outlet manifolds, each manifold having a axial opening coupled with a hose adapted to receive water from, and return water to, the spa, with one of the hoses being provided with a submersible pump. The solar collector array also has a plurality of sets of tubes coupling the inlet manifold with the outlet manifold, each of the sets of tubes having webbing connecting the tubes along the majority of their lengths, the webbing having terminating lines a distance remote from the ends of the tubes and terminating lines a distance remote from the longitudinal central line of the tubes. The method further comprises the step of positioning the manifolds parallel with, and adjacent to, one another with their sets of tubes and webbing extending outwardly therefrom in the same direction and in an overlapping relationship with an upper layer of sets of tubes coupled with one manifold and with aa lower layer of sets of tubes coupled with the other manifold. The method further comprises the steps of shifting one manifold axialy with respect to the other manifold a distance equal to half the distance between the tubes of one set whereby the spaces between the sets of tubes in the upper layer overlie the middles of the sets of tubes in the lower layer and spreading out the sets of tubes whereby each set of tubes of the upper layer is positioned upon a supporting surface between a set of tubes of the lower layer which are also positioned upon the supporting surface.

Lastly, the present invention may be incorporated into a method of storing a system for the solar heating of water in a spa. The method comprises the steps of providing a solar collector array having cylindrical upper and lower manifolds, each manifold having an axial opening coupled with a hose adapted to receive water from, and return water to, the spa, with one of the hoses being provided with a submersible pump. The solar collector array also has a plurality of sets of tubes coupling the upper manifold with the lower manifold, each of the sets of tubes having webbing connecting the tubes along the majority of their lengths, the webbing having terminating lines a distance remote from the ends of the tubes and terminating lines a distance remote from the longitudinal central line of the tubes, the manifolds being positioned parallel with, and adjacent to, one another with their sets of tubes and webbing extending outwardly therefrom in the same direction and with one manifold shifted axially with respect to the other a distance equal to half the distance between the tubes of one set whereby all the sets of tubes may be spread out for positioning on a common supporting surface. The method further comprises the steps of axially shifting one manifold with respect to the other manifold so that their ends are aligned and then shifting the tubes of the sets into parallel with each other so that the halves of the tubes coupled with the lower manifold are supported with their webbings contiguous with each other upon the supporting surface and the halves of the tubes coupled with the upper manifold are supported with their webbings contiguous with each other upon the halves of tubes therebeneath. The method then comprises the step of, beginning with the manifolds held together, rolling the manifolds over the tubes to thereby roll up the tubes onto the manifolds to form a compact cylindrical package for storage purposes.

The foregoing has outlined rather broadly the more pertinent and important features of the present invention in order that the detailed description of the invention that follows may be better understood whereby the present contribution to the art may be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other apparatus or method steps for carrying out the same purposes of the present invention. It should also be realized by those skilled in the art that such equivalent apparatus and method steps do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings in which.

Similar reference numerals refer to similar parts through the several Figures.

DETAILED DESCRIPTION OF THE INVENTION

Figure 1:
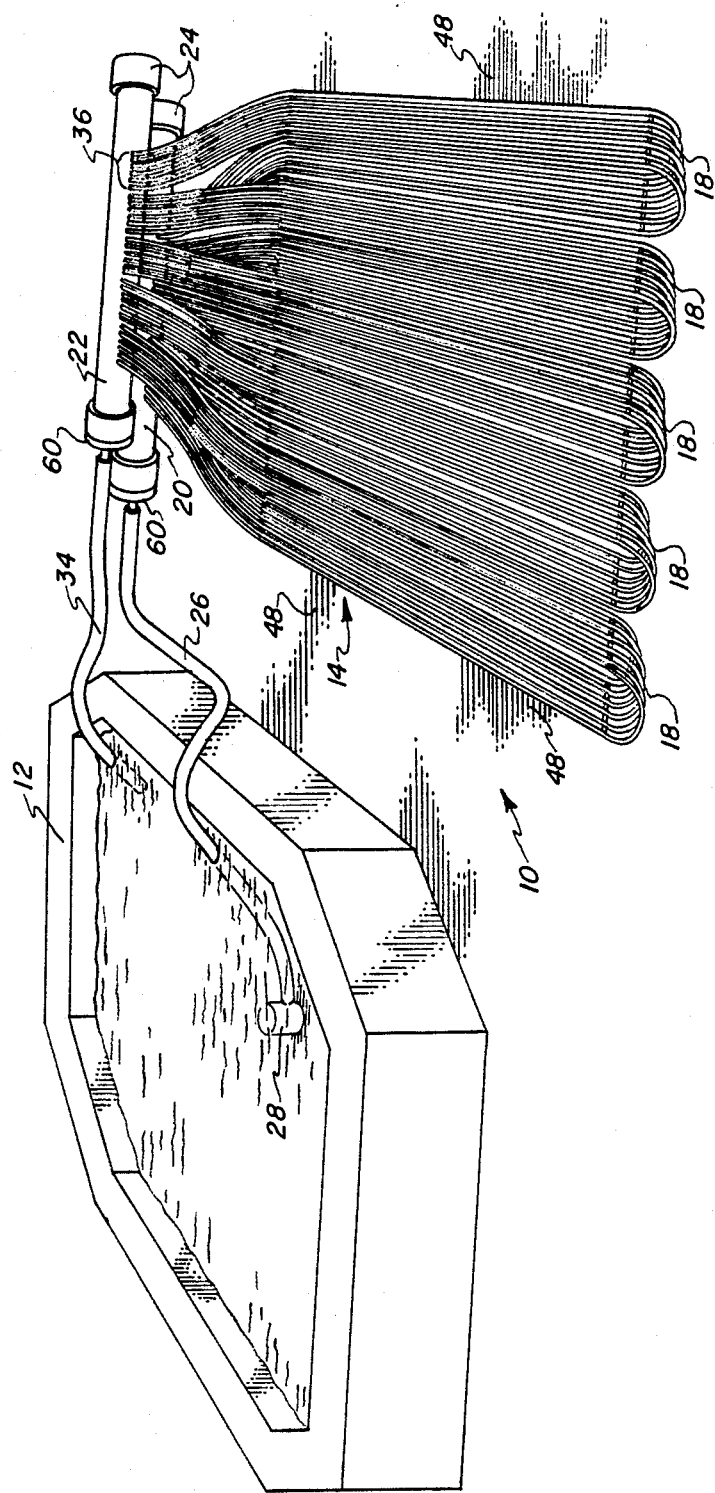
FIG. 1 is a perspective illustration of a solar energy heating system constructed in accordance with the principles of the present invention, the system being operatively positioned in associated with a spa to be heated.

Shown in FIG. 1 is the assembled solar energy system 10 constructed in accordance with the principles of the present invention. It is shown in operative association with a spa 12 filled with water to be heated. Spas are generally small pools of water for bathing purposes with the water being heated to a temperature of about 100° F. Fahrenheit. Such spas may be provided with jets of water or flows of air bubbles for therapeutic purposes or simply for relaxation.

The main heating components of the solar energy system is a mat or array 14 formed of solar collector devices arranged in sets 18 operatively coupled between an inlet manifold 20 and an outlet manifold 22. The inlet manifold has an end cap 24 to seal one end while its other end is coupled through an inlet hose 26 to a pump 28 for creating a flow of water into the inlet manifold 20, through the solar collector array 14, and back into the spa 12. A similar configured outlet manifold 22 is provided at the opposite end of the solar collector array. It also includes an identical sealing end cap 24 at one end and an outlet hose 34 coupled to the opposite end for returning the heated water back to the spa.

The solar collector array 14 is constructed of any conventional construction material which is flexible and durable. Any of the known natural or synthetic rubbers or blends thereof might be utilized. Known additives for extending its life due to exposure to water, the atmosphere, solar rays or the like might readily be added in the conventional manner. Since the solar collector array functions to receive the rays of the sun for heating water being conveyed therethrough, the solar collector array is colored black for maximum absorption of the energy from the sun and, hence, maximum thermal efficiency of the system.

The solar collector array is preferably constructed of a plurality of sets 18, five shown in the disclosed preferred embodiment. Each set includes a grouping of tubes 36 of the same cylindrical shape and length secured in spaced, parallel relationship one from another through a rubber like webbing 38. The webbing is fabricated of the same material as the tubes and is adapted to maintain the parallel relationship of the tubes over the majority of their lengths.

Figure 2:
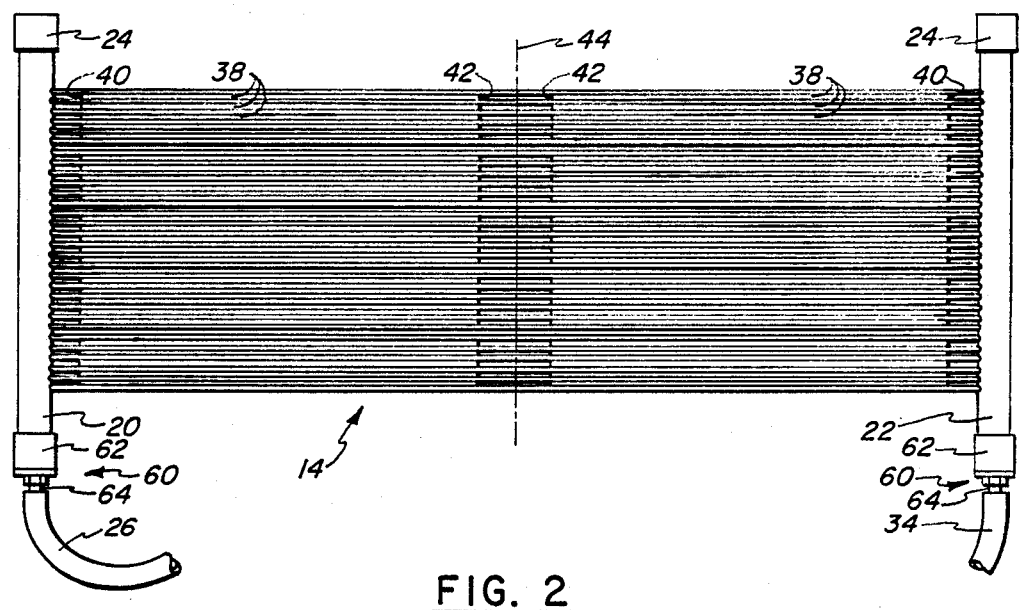
FIG. 2 is a plan view of the solar energy heating system shown in FIG. 1 but with the solar collector array of plural sets of tubes and webbing in an extended orientation.
Figure 3:
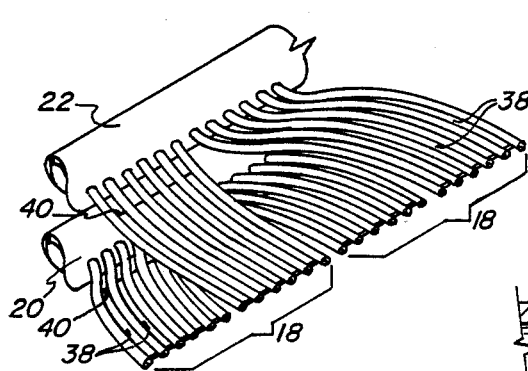
FIG. 3 is an enlarged perspective illustration of the manifolds and end portions of the solar collector arrays as shown in FIG. 1.
Figure 4:
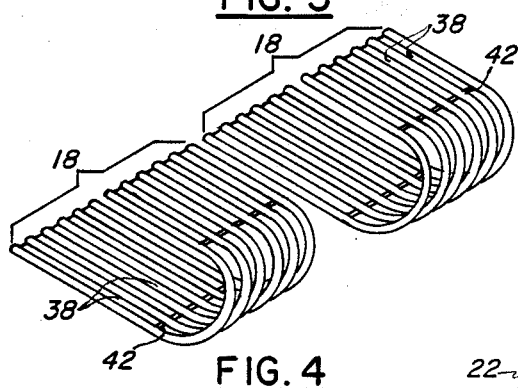
FIG. 4 is an enlarged perspective illustration of central portions of the solar collector array as shown in FIG. 1.

The orientation of tubes to webbing can most readily be seen by reference to FIG. 2 which illustrates, for explanatory purposes only, the solar collector array in a total extended orientation. The webbing 38 extends inwardly from adjacent to the ends of the tubes 36. It begins at exterior webbing end lines 40 a fixed, predetermined distance from both the inlet ends and outlet ends of the tubes. In addition, the webbing is terminated at interior webbing end lines 42 located about 6 inches from the longitudinal central line 44 of the tubes, an imaginary line extending perpendicularly through the axes of the tubes at their midpoints when extended. The area of the tubes adjacent to the longitudinal central line, being formed without webbing, allows for the easy bending of the sets of tubes as they bend back when positioned for operation and use as shown in FIGS. 1 and 4. The ends of the tubes adjacent to the inlet and outlet manifolds 20 and 22 are also formed without webbing. This allows for their spreading out and their side by side positioning of the sets of tubes of the solar collector array on a common support surface 48 when operatively positioned adjacent one side of the spa 12 as shown in FIGS. 1, 3 and 4.

Each set 18 of tubes 36 and webbing 38 within the solar collector array 14 is disclosed as including a plurality of tubes. In the presently disclosed primary embodiment, five sets of tubes with six tubes in each set are utilized or a total of 30 tubes. It should be understood, however, that any number of tubes and arrays, more or less than that disclosed, could readily be utilized as a function of the particular application.

The inlet and outlet manifolds 20 and 22 are disclosed as being of identical construction. As a result, only one such manifold will be herein described. Each manifold is formed as a rigid tubular member 50. The inlet manifold is adapted to receive water from the spa through the inlet hose 26 and to direct it through the tubes 36 of the solar collector array 14. The outlet manifold 22 is adapted to receive heated water from the tubes 36 and feed it through the outlet hose 34 back to the spa in a heated condition. Each manifold is tubular in shape for ease of fabrication. It is preferably extruded of a stiff, high impact, moldable or extrudable plastic, well known in the art. ABS is preferred. Along the length of each manifold are a plurality of holes 52 radially formed by drilling or the like. The holes of each manifold are equally spaced and equal in number to the number of tubes 36 desired for the particular application. Thirty holes, equal in number to the thirty tubes, are employed in the presently disclosed preferred embodiment.

Figure 5:
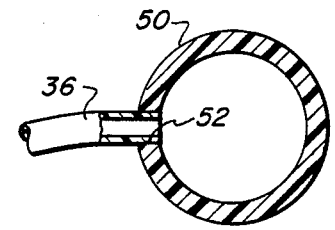
FIG. 5 is a sectional view of a coupling arrangement between one of the tubes and a manifold.
Figure 6:
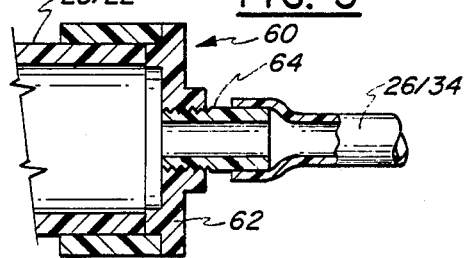
FIG. 6 is a sectional view of a coupling arrangement between one of the hoses and a manifold.

Coupling of the holes 52 of the manifolds 20 and 22 to the tubes 36 of the solar collector array is achieved through a press fitting which may be seen in FIG. 5. As can be understood, the outside diameter of the tubes is essentially the same as the diameter of the holes. Coupling of the tubes 36 to the manifolds 20 and 22 can be done manually by inserting a hose end into each radial hole 52 of the manifold. An appropriate adhesive may be utilized for securing the tubes to the manifolds.

The ends of each manifold are provided with end caps 24 positionable over their exterior surfaces. The end caps are press fit and preferably adhered thereto with a suitable adhesive. Stoppers positioned within the interior surfaces or bores of the manifolds could readily be substituted for the end caps 24.

The ends of the manifolds opposite the end caps 24 include mechanisms or apparatus 60 for coupling with the inlet and outlet hoses 26 and 34. These ends preferably include couplings 62 press fit over the exterior surfaces of the manifolds with axially aligned threaded apertures for receiving the threads interior ends of nipples 64. The nipples, in turn, connect the couplings to the inlet and outlet hoses 26 and 34 for allowing the flow of water between the manifolds 20 and 22 and the spa 12. Slipping the hoses over the nipples is facilitated by first heating the hoses. The arrangement between the couplings 62 and nipples 64 may be made permanent by a suitable adhesive between the manifolds 20 and 22 and their couplings 62, between the couplings 62 and their nipples 64, as well as between the nipples 64 and their hoses 26 and 34. The hoses are preferably formed of a flexible elastomeric material, (i.e. neoprene) with additives to extend its life due to the effects of exposure to water, air and the sun.

The free end of the outlet hose 34 opposite the manifold merely rests in the water of the spa for the adding of heated water to replace that removed by the pump. The free end of the inlet hose 26 opposite from the end coupled to the manifold is attached to a pump 28. The pump is submersible and functions to cause the flow of water from the spa 12 through the inlet hose 26, through the solar collector array 14 for being heated, then back to the spa 12 through the outlet hose 34. An electrical cord 66 couples the water pump 28 to a source of electricity such as a wall outlet.

In the preferred embodiment, each manifold 20 and 22 is about 1.5 inches in internal diameter and about 45 inches in length. Thirty holes are drilled radially along a common line of each manifold for receiving the thirty tubes. The radial holes 52 are about 5/32 inches in diameter, with about 11/16 inches between their centerlines, leaving about 2 inches free on each end of the manifolds for receiving the end caps 24 and couplings 62. The manifold tubes 36 are 1.5 (ID) inches in diameter and about 45 inches in length. It has been found with six tubes per set and five sets per solar collector array, a 1/160 horse power submersible pump having a flow rate of 120 gallons per hour at a pressure of 2 pounds per square inch will increase the water of the spa (250 gallons) from an ambient temperature of 70° F. Fahrenheit to about 80° Fahrenheit in about 8 hours on a day of normal sunshine 10°/8 hour period to max of 100°-104° F. It has also been found that maximum efficiency may be attained with a solar energy system of the present invention by arranging the solar collector array in specifically the manner as shown in FIGS. 1, 3 and 4.

Note is taken that if the solar array were fully extended as shown in FIG. 2, and then one manifold were pulled to overlie the other, only half of the tubes would be exposed to solar energy. Such an arrangement would not be efficient. It is, therefore, proposed that one manifold be located essentially on top of the other but offset axially by a distance equal to half the width of one set of tubes and webbing, about 4.75 inches in the preferred embodiment as disclosed above. In this manner, the tubes adjacent to the manifolds, regions of tubes without webbing, may be spread out with their associated sets of tubes and webbings also spread out. In this manner, all the sets with their tubes and webbing may rest on a common support surface 48 for exposure of all the tubes to the direct rays of the sun. The central set may have its upper and lower halves rest side by side upon the surface supporting the array. The sets on opposite sides of the central set would be angled further away from the central set at their free ends adjacent to the manifold. These intermediate sets would, likewise, have their halves set side by side upon the common supporting surface. Lastly, the endmost sets would have their halves resting side by side upon the supporting surface. the ends of their tubes adjacent to the manifold would be angled greater than the central or intermediate sets of the tubes. The halves of each set of tubes coupled to the upper manifold would rest between adjacent set halves coupled to the lower manifold in a parallel relationship with respect to each other and with the adjacent tubes and webbings in a side by side orientation, with their webbings in a parallel, touching, or contiguous relationship. By this orientation of sets of tubes, the solar collector array will receive the maximum of solar energy from the sun for most efficient use of the system and the fastest heating of the water of the spa.

It should be understood, that the holes 52 in the manifold could, in a modified version (not shown), be formed in sets of size as described above, but with a space between each set of six holes equal in distance to the length of the six holes in a modified version. Such would add four spaces of 4.75 inches each to the length of each manifold for set of six. When such a modified version is utilized, however, the side by side halves of each set could be rested on the supporting surface without the spreading out of the tubes as described above in the primary embodiment. Such a modified version, however, would add size, weight and cost to the system. If the spacing between the sets of holes along the manifolds were less, then the spreading out of the tubes would be proportionately less and the lengths of the manifolds would be proportionately less than the modified version and proportionately greater than that of the primary embodiment.

Figure 7:
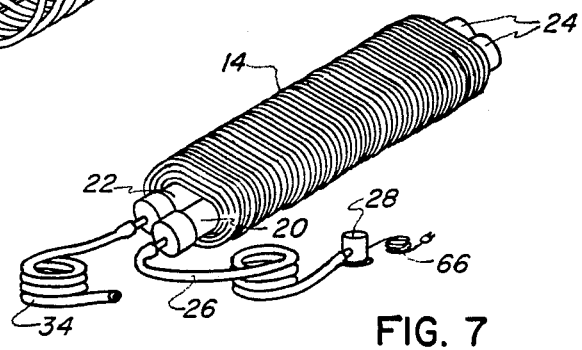
FIG. 7 is a perspective illustration of the solar energy heating system constructed in accordance with the principles of the present invention, the system being in a rolled up orientation prior to storage or installation.

The solar energy system of the present invention is light weight and compact rendering it convenient for installation adjacent to the pool as well as for storage purposes. When its use is no longer desired for a period of time such as for the winter, the manifolds would be axially shifted, with their ends in alignment. The sets of tubes coupled with the lower manifold would be brought together with their webbing in a touching or contiguous relationship, resting upon the support surface. The sets of tubes coupled with the upper manifold would also be brought together side by side and parallel with their webbing in a touching or contiguous relationship, resting upon the lower layer of sets of tubes. Then, beginning with the manifolds held together, the manifolds would be rolled upon the layered sets of tubes until the manifolds and sets of tubes were completely rolled up into a cylindrical orientation with the manifolds at the center for storage or shipment. The hoses and motor would be located external of the rolled up package for special protective handling. When rolled up, the system could be packaged in a carton 60 inches in length and either 15 inches in diameter or 15 by 15 inches in rectangular cross section. Note FIG. 7. No assembly or disassembly would be required since all parts are coupled, one to another. If for some reason a particular application required unique heating capabilities, as for example, longer hoses or larger motors, the ends of the hoses could be formed readily disconnectable from the manifolds or motor. Conventional bayonet type couplings or the like could readily be utilized.

The present disclosure includes that information contained in the appended claims as well as that in the foregoing description. Although the invention has been described in its preferred form or embodiment with a certain degree of particularity, it is understood that the present disclosure of the preferred form has been made only by way of example and that numerous changes in the details of construction, fabrication and use, including the combination and arrangement of parts and method steps, may be restored to without departing from the spirit and scope of the invention.

What is claimed is:

1. A solar collector array adapted to receive water from a spa, to heat the received water and then to conduct the heated water back to the spa, the solar collector array including:

cylindrical inlet manifold having an axial opening by which water from the spa may be received and having a series of equally spaced radial holes extending along its length;

a cylindrical outlet manifold having an axial opening by which heated water may be conducted back to the spa and having a series of equally spaced radial holes extending along its length;

a plurality of flexible tubes arranged in a plurality of sets of tubes with each of the tubes having a first end attached to a hole in the inlet manifold and a second end attached in a hole of the outlet manifold thereby forming a flow path between the inlet and outlet manifolds with a transverse centerline defined midway between the manifolds and the ends of the tubes when said array is extended; and a plurality of webbing components arranged side-by-side and in pairs with each pair having one webbing component on one side of the transverse centerline and another webbing component on the other side of the centerline with first ends of the webbing components adjacent and spaced from a manifold to define a first space in the direction of the lengths of the tubes between the first ends of each webbing component and the adjacent manifold and a second space in the direction of the lengths of the tubes between a second end of each webbing component and a second end of an associated webbing component of each pair with each webbing component receiving tubes from one of said sets of tubes from one adjacent manifold only whereby the manifolds may be located parallel with respect to each other a distance equal to the length of the tubes with each pair of webbing components coupling to only one set of tubes, each webbing component being separated from its laterally adjacent webbing component whereby the tubes may be folded with the manifolds located parallel with and adjacent to each other with the webbing components on one side of the centerline along with their received tubes being laterally separated from each other with the lateral separations therebetween filled by separated webbing components from the other side of the centerline.

2. A solar collector array as set forth in claim 1 and further including an end cap secured to a first end of each manifold and, at a second end of each manifold, means for coupling the manifold with a hose.

3. A solar collector array as set forth in claim 2 wherein the means for coupling the manifold with a hose includes a coupler secured over the second end of the manifold and a nipple having an internal end extending axially through the coupler and an external end for being recieved by a hose.

* * * * *